UNITED STATES PATENT OFFICE.

RUDOLF RICKMANN, OF KALK, NEAR COLOGNE, GERMANY.

MANUFACTURE OF WHITE AND LIGHT-COLORED ENAMELS AND GLAZINGS.

SPECIFICATION forming part of Letters Patent No. 716,106, dated December 16, 1902.

Application filed December 19, 1901. Serial No. 86,595. (No specimens.)

*To all whom it may concern:*

Be it known that I, RUDOLF RICKMANN, Ph. D., chemical engineer, a citizen of the German Empire, residing at 325 Hauptstrasse, Kalk, near Cologne, Germany, have invented a new and useful Improvement in the Manufacture of White and Light-Colored Enamels and Glazings, of which the following is a specification.

This invention relates to the manufacture of white enamels and glazings. It is old to produce yellow enamels and glazings by means of antimonic oxid, especially in combination with lead; but heretofore it has not been practical to produce white enamels and glazings of a quality suitable for practical purposes by the use of combinations of antimony. On the one hand, the covering power was insufficient, so that it was necessary to use so large a quantity of antimonic acid that the cost of production became very high, and, on the other hand, the quality of the enamel or glazing produced was inferior in consequence of the want of luster and ductibility.

I have found that it is possible to manufacture enamels and glazings of a very good quality by using sodium antimoniate instead of free antimonic acid. Such enamels and glazings may be manufactured in various different ways. For example, a mixture of feldspar, quartz, borax, soda, and the like is melted, and the enamel or glazing thus obtained is first ground and then mixed with sodium antimoniate, or the enamel or glazing is mixed with the sodium antimoniate and the mixture then ground in a wet mill, or the sodium antimoniate is ground with the enamel or glazing already prepared and after application to the metal or clay to be coated is fused and annealed. The last-explained method of procedure produces by far the best result. By using seven to ten per cent. of sodium antimoniate a good covering of white and durable enamel or glazing is obtained.

Having described my invention, what I claim is—

The herein-described process of making white opaque enamels and glazings, consisting in fusing sodium antimoniate with the enamel or glazing.

In witness whereof I have hereunto set my hand in presence of two witnesses.

RUDOLF RICKMANN.

Witnesses:
 CHARLES LESIMPLE,
 CARL SCHMITT.